United States Patent
Nicholas

[15] 3,694,099
[45] Sept. 26, 1972

[54] BORING TOOL
[72] Inventor: George C. Nicholas, 141 Austin St., Worcester, Mass. 01609
[22] Filed: Oct. 23, 1970
[21] Appl. No.: 83,462

[52] U.S. Cl. .................................................. 408/58
[51] Int. Cl. ............................................. B23b 29/03
[58] Field of Search .................................. 408/56–59

[56] References Cited

UNITED STATES PATENTS

| | | |
|---|---|---|
| 754,350 | 3/1904 | Shaull et al. ................... 408/58 |
| 2,971,409 | 2/1961 | Peters et al. ................... 408/59 |
| 665,158 | 1/1901 | Abrams ......................... 408/58 |
| 1,451,610 | 4/1923 | Gestas .......................... 408/58 |

Primary Examiner—Gerald A. Dost
Attorney—Norman S. Blodgett

[57] ABSTRACT

In general, this invention relates to a tool for forming bores in material, wherein the tool has a shaft, a cutting element mounted on one end of the shaft, and a suction passage in the shaft to remove chips.

6 Claims, 9 Drawing Figures

PATENTED SEP 26 1972
3,694,099
SHEET 1 OF 2
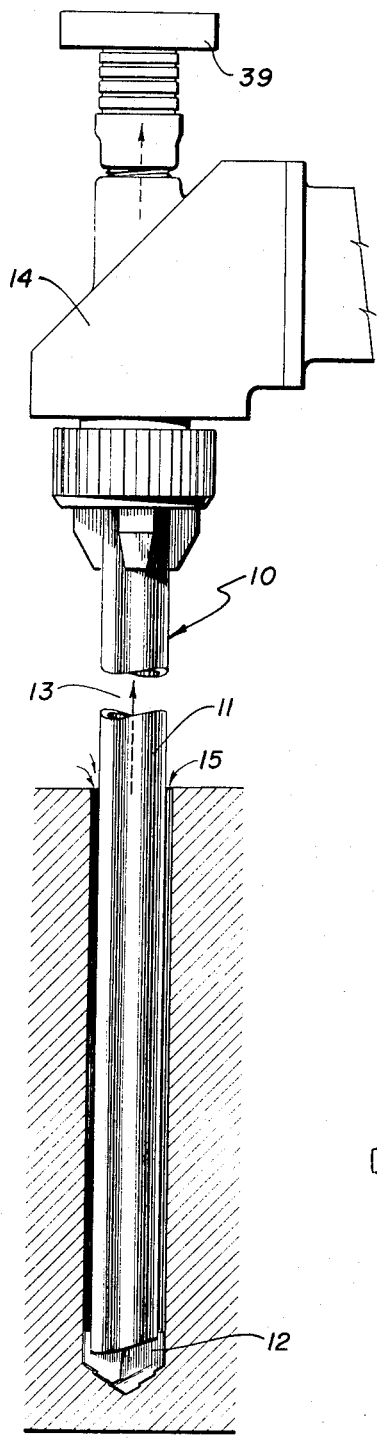
FIG. 1
FIG. 2
FIG. 3
FIG. 4
FIG. 5
GEORGE C. NICHOLAS
INVENTOR.
BY

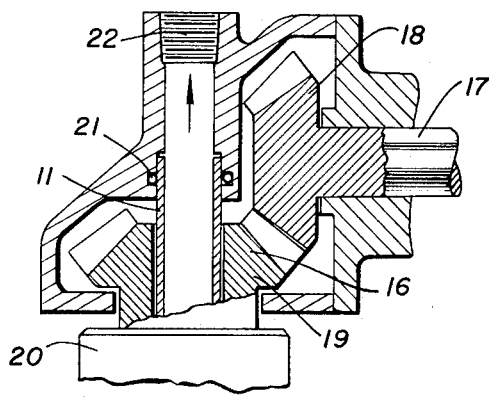
FIG. 6
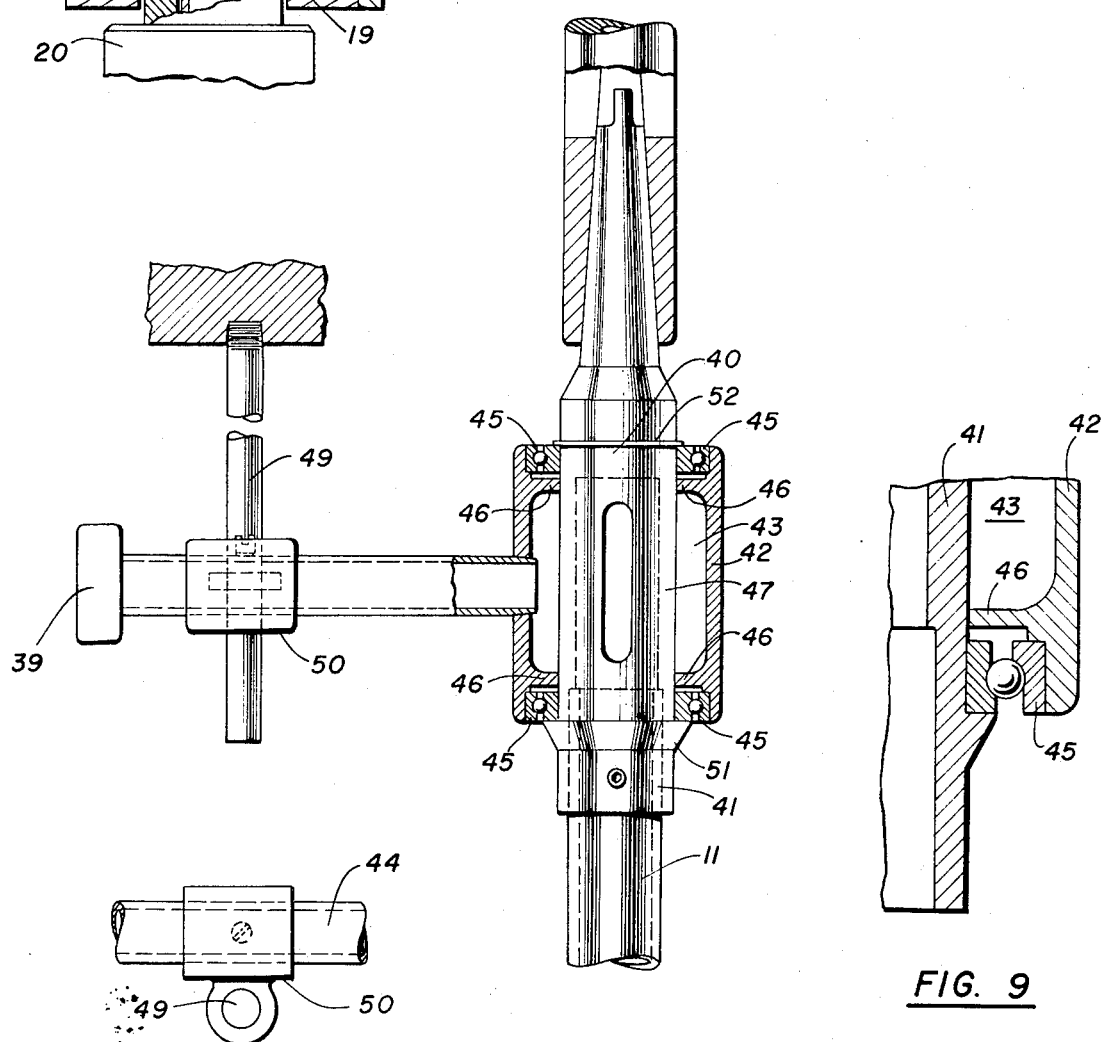
FIG. 7
FIG. 8
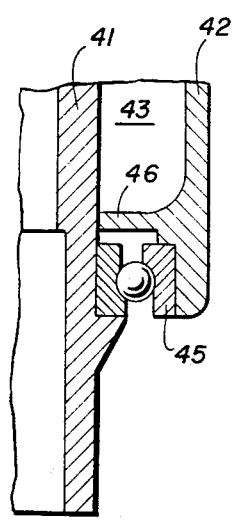
FIG. 9

BORING TOOL

BACKGROUND OF THE INVENTION

The efficient and accurate production of bores (especially deep bores) in workpieces is a matter of no small interest in the machine tool industry. This is evidenced by the numerous patents in this area. As far as the cutting tool itself is concerned, the so-called "boring tool" has been found to be most satisfactory for many applications. A boring tool involves a shank mounted in the chuck of a machine tool, having at its working end a cutting element of hardened material such as high-speed steel or carbide. Several important problems have become apparent in the use of this type of tool on bores of any significant depth where the material is cast iron. First, the problem of attaching the cutting element to the shank exists; if the shank must be long, it cannot be made of the hard, brittle material necessary in the cutting element. The problem with connecting non-homogeneous materials is that normal methods, such as adhesion or welding, will not produce a bond of sufficient working strength. The necessary alternative is the use of various mechanical bonds such as set-screws and rivets which, sometimes, operate effectively to make the system workable. The drawback, however, is well-known in the art and is one of which leads to the second problem.

In many of the more practical mechanical bonding designs, the cutting element must be mounted asymmetrically with respect to the shank. Cutting elements which are positioned non-symmetrically result in unbalanced force couples and, thereby, deflection of the shaft and general vibration. High-speed, accurate work becomes impossible without guides along the length of the bore.

The last problem (and one which is particularly acute in friable materials where boring tools would be expected to perform best) has to do with the removal of chips. As the boring tool moves through the workpiece, the accumulated chips resist the cutting operation and score the walls of the bore. To be effective, the chip removal must take place at the working face, since removal at a distance from the work face still allows the chip to interfere with the cutting operation. Previous attempts to achieve the former effect have been, at best, limited in usefulness.

These and other difficulties experienced with the prior art devices have been obviated in a novel manner by the present invention.

It is, therefore, an outstanding object of the invention to provide a boring tool that removes the chips that it produces.

Another object of this invention is the provision of a boring tool whose structure is not significantly weakened by adding a self-cleaning function.

A further object of the present invention is the provision of a boring tool with an attached cutting element which cuts into the workpiece and then continues to crush the chips until they are small enough to be removed by means of a suction bore located adjacent the cutting element.

It is another object of the instant invention to provide a boring tool which comprises a suction system which cleans chips out of the workpiece but does not interfere with the operation of the boring tool.

A still further object of the invention is the provision of a boring tool which has a tungsten carbide cutting element attached symmetrically to it so that it does not block a chip removing system.

Another object of the invention is the provision of a boring tool having a carbide cutting element attached by means which is predominantly mechanical, thus allowing operation at high temperature.

SUMMARY OF THE INVENTION

In general, the present invention consists of a boring tool having a shank which is held by the chuck of a machine tool at one end, which has a cutting element attached to the other end of the shank, which has a bore extending axially of the shaft from the cutting element, and which has means for applying suction to the bore.

BRIEF DESCRIPTION OF THE DRAWINGS

The character of the invention, however, may be best understood by reference to one of its structural forms, as illustrated by the accompanying drawings, in which:

FIG. 1 is an elevational view of a boring tool embodying the principles of the present invention, FIG. 2 is a perspective view of the working end of the boring tool showing the end of the shank, the suction bore, and the cutting element, FIG. 3 is a front elevational view of the working end of the boring tool, FIG. 4 is a left elevation of the working end of the boring tool, FIG. 5 is a bottom plan view of the working end of the boring tool, FIG. 6 is a sectional view of FIG. 1 showing the driven end of the shank including a suction seal, FIG. 7 is a partial sectional view of a modified form of the invention, FIG. 8 is a bottom plan view of the bar shown in FIG. 7 showing the connection between parts of the invention, and FIG. 9 is a sectional view of the seals and bearings used in the embodiment of FIG. 7.

DESCRIPTION OF THE PREFERRED EMBODIMENT

Referring first to FIG. 1, wherein are best shown the general features of the invention, the boring tool, indicated generally by the reference numeral 10, is shown as having a shank 11, a cutting element 12, a suction bore 13, and means for effecting a suction in the suction bore, the means being indicated generally by the reference numeral 14. The shank 11 is tubular in nature having a centrally located suction bore 13 running axially of its length, the shank being made of material suitable for the intended use of the tool. Symmetrically mounted in notches 23 in the working end of the shank 11 so as not to block the bore is a tungsten carbide plate shown in FIGS. 1–5. This particular cutting element is especially useful in cast iron work due to the cutting and crushing action it brings about. This action renders the chips particularly easy to remove by the present method. The cutting element extends beyond the extremity and periphery of the shank, thereby protecting the shank from attrition and creating air inlet spaces 15 as the tool functions. The cutting element is secured in the notches using a high-temperature adhesive or a weld, but this bond does not bear the working stress. The mechanical interlocking of the element and the notches bears almost the entire burden. The suction is applied at the driven end of the tool.

FIG. 6 shows a section of the tool holder of FIG. 1. Involved is the drive train 16 which includes a drive shaft 17, two bevel gears 18 and 19 and a chuck 20 driven by the train and grasping the shank 11. Also involved are the driven end of the shank 11, the connection 22 to the vacuum pump 39, and the ring seal 21 between the shanks and the connection. The ring seal allows rotation of the shank relative to the connection while maintaining necessary air-tightness.

FIG. 7 shows a commutating coupling designated generally by the numeral 40 which allows the boring tool to be used in unmodified tool holders. It involves a body 41 which grasps the working end of the shank and holds it with a set screw. A driven end of the body fits a standard tool holder. A shell 42 defines a cavity 43 outside the body and is rotatably mounted on the body. A vacuum line 44 effects a vacuum in the cavity 43. Also provided are bearings 45 and seals 46 which separate the shell and the body, a bore 47 and ports 48 which connect the suction bore 13 of the shank 11 to the cavity 43, and lastly a support 49 which secures the vacuum line 44 and thereby keeps the shell 42 from rotating with the holder 40.

FIG. 8 shows the connector 50 as it joins the vacuum line 44 and the support 49. The connector is simply two cylinders welded at a right angle to one another and fitted with set screws to secure the members which are to be held.

FIG. 9 shows the seals 46 and bearings 45 that connect the holder 41 and the shell 42, thereby defining the cavity 43. As shown in FIG. 7 and FIG. 9, the shell and seals may be of one piece molded construction with snap-in bearings. The unit is then installed on the holder by sliding it over the driven end of the holder down to stops 51 and retaining it in position with retaining ring 52.

The use and operation of the invention will now be readily understood in view of the above description. The boring tool is placed in a suitable machine tool such as a drill press and the workpiece is positioned. Suction is applied to the suction bore 13 by a shop vacuum cleaner 39 through the tool holder in the first instance and through the commutating holder in the second instance. This suction causes a flow of air in to the suction bore adjacent the cutting element, up the shank and through the apparatus to the shop vacuum cleaner 39. This flow of air will carry with it any particles present at the working end of the shank. The tool is then rotated and lowered into the workpiece. The cutting element cuts into the workpiece producing chips which continue to be crushed by the cutting element until they are small enough to be pulled up the suction bore by the flow of air. As the tool moves into the workpiece, the flow of inlet air continues down the inlet air spaces 15 that are formed by the edges of the cutting element that extend behond the periphery of the shank. Thus, the continuous flow of air removes the chips and, furthermore, dissipates heat formed at the cutting face. The chips move through the vacuum system and are collected in the vacuum cleaner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

I claim:

1. A boring tool, comprising:
   a. a long shank with a hollow bore passing longitudinally through its central portion, said shank having a first end which is acceptable to a tool holder of a machine tool, and a second end at which the bore forms an opening, said opening having a peripheral edge,
   b. two notches provided in the edge, each notch having a first edge portion associated with it on one side and a second edge portion associated with it on the other, said first edge portion extending axially, substantially beyond said second edge portion, and
   c. a cutting element, carried in the notches.

2. A boring tool, as recited in claim 1, wherein the said first edge portions associated with the notches are diametrically opposed to one another.

3. A boring tool as recited in claim 1, wherein said bore is sealed at said first end.

4. A boring tool as recited in claim 1, wherein said cutting element is a plate of carbide.

5. A boring tool as recited in claim 1, wherein said cutting element is positioned symmetrically on said shank.

6. A boring tool as recited in claim 1, wherein said means to apply suction comprises a vacuum pump and a coupling between said shank and said vacuum pump, so that suction is applied to said bore while said shank is rotating.

* * * * *